June 22, 1943.  C. W. BAIRD  2,322,218
CONTROL SYSTEM
Filed March 28, 1942
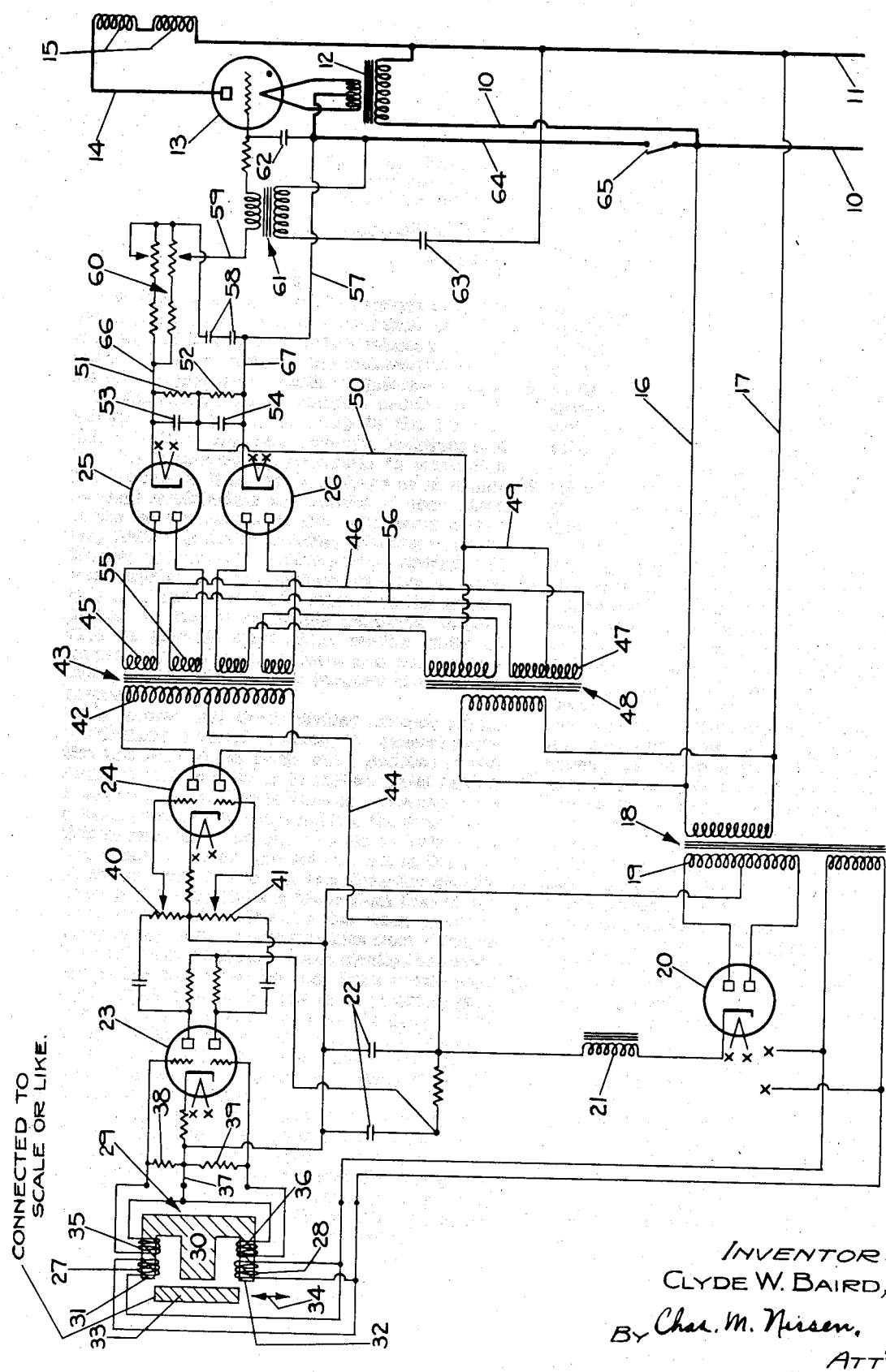
INVENTOR:
CLYDE W. BAIRD,
By Chas. M. Nissen,
ATTY.

Patented June 22, 1943

2,322,218

UNITED STATES PATENT OFFICE 2,322,218

CONTROL SYSTEM

Clyde W. Baird, Columbus, Ohio, assignor to The Traylor Vibrator Company, a corporation of Colorado Application March 28, 1942, Serial No. 436,698

21 Claims. (Cl. 172—240)

This invention relates to an electric control system adapted to control automatically the feed rate of an electric feeder such as a vibratory feeder.

An object of the invention is to provide improved and simplified apparatus of the above mentioned type in which the control is fully automatic and is extremely accurate and sensitive, yet involves simple and inexpensive structures and eliminates entirely the use of magnetic relays, motor driven rheostats and the like.

A further object of the invention is to provide an electron type of control system which is extremely simple in operation.

A further object of the invention is to provide an improved magnetic control circuit adapted to produce a variable voltage which may be shifted in phase by 180 degrees.

A further object of the invention is to provide a control circuit for an electron tube including means to shift the phase relation of the grid or input and plate or output voltages.

A further object of the invention is to provide a highly efficient simplified control circuit for a constant capacity feeder.

Other objects of the invention will appear hereinafter, the novel features and combinations being set forth in the appended claims.

In the accompanying drawing, the single figure shows a wiring diagram of the complete system comprising my invention, it being understood that certain aspects of the invention include separable sub-combinations thereof.

The system disclosed in the drawing has been designed specifically as a substitute for the control system shown in Fig. 18 of the patent to Earle V. Francis, No. 2,276,383, dated March 17, 1942, although it is to be understood that its utility is not to be restricted to the particular apparatus disclosed in said patent but it may be used to control various other devices.

Referring to the wiring diagram, it will be seen that I have provided power mains 10 and 11 adapted to be energized from any source of alternating current such as 60 cycle source having a voltage of 110, 220 or 440 volts. The primary of the transformer 12 is connected across said mains 10 and 11 and is energized whenever said mains are energized, energization being controlled by a switch, not illustrated. The secondary of the transformer 12 is connected to a filament or cathode of a power tube 13 of the electron discharge type which is preferably a gaseous tube in case the current demand is relatively high. If the current demand is in the range of a vacuum tube, such a tube may, of course, be employed.

The plate or anode of the tube 13 leads by way of a conductor 14 to a coil 15 which may be the field coil of a vibratory feeder such as the field coil 87 of the vibratory feeder 81 of the above identified patent to Earle V. Francis. The coil 15 may also be any other type of motor control which is responsive to the current flow therethrough as, for example, the coil of a saturable transformer or reactance. The other terminal of the coil 15 is connected directly to the power main 11. Energized from the power mains 10 and 11 by way of conductors 16 and 17 is a transformer 18 having a split secondary 19 cooperating with a full wave rectifier tube 20 having in its output circuit the usual choke coil 21 and by-pass condensers 22 which provide a source of direct current for two push pull amplifier tubes 23 and 24 as hereinafter described. A second secondary on the transformer 18 provides current for the filaments for the tubes 20, 23 and 24, as well as two full wave rectifier tubes 25 and 26, the complete circuits for these filaments not being shown but indicated by the letters X X. These filaments may be connected in series or in parallel as desired in accordance with well known practice. Said secondary of transformer 18 also energizes two primary coils 27 and 28 of a control device 29 which is essentially like a transformer having an E-shaped core 30, the coils 27 and 28 being wound on outer legs 31 and 32, respectively, of said core. Opposite the center leg of the core 30 is a movable, adjustable or shiftable core 33, said core being movable in opposite directions from its normal position, illustrated in the drawing as suggested by the arrow 34. The adjustable core 33 is illustrated in its normal position and preferably when in such position indicates a normal position of the apparatus being controlled. For example, the core 33 may be controlled by a scale beam such as the scale beam 73 of the patent to Earle V. Francis above-identified, so that when said scale beam is in its normal or balanced position the core 33 will be in its normal position and when said scale beam is relatively high, said core 33 will move in one direction along the line of the arrow 34. When said scale beam is low, core 33 will move in the opposite direction. It is, of course, obvious that other mechanism, such as an indicator of any type which has a normal position, a high position and a low position, may control the core 33.

Mounted on the legs 31 and 32 of the core 30 are secondary coils 35 and 36, respectively, which coils have one terminal connected together and connected by way of conductor 37 to a common terminal point of resistors 38 and 39. The free or outer terminals of said resistors 38 and 39 are connected individually to the other terminals of said coils 35 and 36, respectively. When the core 33 is in its normal position, as illustrated in the drawing, the voltage induced in the secondary windings 35 and 36 will be the same and consequently the voltage drop across resistor 38 will be the same as the voltage drop across resistor 39, and these voltages are so poled that the voltage drop across the outer terminals of resistors 38 and 39 will under these conditions be equal to zero. If the core 33 is moved upwardly as viewed in the drawing, the voltage in winding 35 will be increased and the voltage in winding 36 will be decreased, consequently increasing the voltage drop across resistor 38 and decreasing the voltage drop across resistor 39. Movement of said core 33 in the reverse direction will produce a reverse condition in coils 35 and 36 and in resistors 38 and 39. The voltage across resistors 38 and 39 are preferably but not necessarily amplified and in the drawing I have illustrated two stages of amplification provided by the two amplifier tubes 23 and 24 which are connected as push pull amplifiers. If desired, only one of said tubes may be employed provided it affords sufficient amplification and, as above stated, under some conditions no amplification of any kind will be required.

I have shown variation control potentiometers 40 and 41 associated with the input circuit of the tube 24 which are preferably provided to afford adjustment of the gain in the amplifier. Since the circuits for the two tubes 23 and 24 are conventional push pull amplifier connections, they will not be described in detail except, however, it is to be noted that the two anodes or plates of the tube 24 are connected across the outer terminals of the primary winding 42 of transformer 43, which winding 42 has a middle or intermediate tap leading to conductor 44 which is connected to the positive terminal of the direct current supply. It is obvious that any voltage which appears on the resistor 38 will appear in amplified form in the upper half of the winding 42 of transformer 43 and likewise any voltage which appears on the resistor 39 will appear in amplified form in the lower half of said winding 42. Since these voltages are 180 degrees out of phase or opposing, the voltage across the terminals of the winding 42 will be zero when the core 33 is in its normal or balanced condition. When core 33 moves upwardly, the voltage in the upper half of winding 42 will predominate and when the core 33 moves downwardly a reverse condition will exist. Consequently, the voltage on said primary winding 42 may be either zero or may be in either of reverse directions and the value of said voltage may be varied from zero to a maximum in either direction in proportion to the variation of said core 33 from its normal position in reverse directions.

I shall now describe apparatus which is responsive to the resultant voltage in said primary winding 42 and is capable of changing it into a direct current voltage which is controllable in direction or polarity and in amount from zero to a maximum in reverse directions or reversible polarities, as determined by the voltage in said coil 42. That is, when the voltage on coil 42 is zero, the direct current voltage will be zero. When the voltage on coil 42 has one direction, the resulting direct current voltage will have a predetermined direction or polarity and its value will be proportional to the value of said voltage on said coil 42. When the voltage on coil 42 has a reverse direction, the resulting direct current voltage will have a predetermined reverse direction or polarity and its value will be proportional to the value of said voltage on said coil 42.

To this end I provide the two full wave rectifier tubes 25 and 26. One of the plates or anodes of the tube 25 is connected to a secondary winding 45 of transformer 43 and thence by way of conductor 46 to half of a split secondary 47 of a transformer 48, the primary winding of which is energized from the previously described conductors 16 and 17. The complete circuit for said plate and tube 25 extends from the center tap of secondary 47 by way of branch conductor 49 and common conductor 50 to the common terminal of a pair of resistors 51 and 52 which preferably have filtering condensers 53 and 54 connected across their terminals, the free terminal of resistor 51 being connected to the cathode of rectifier tube 25 and the free terminal of resistor 52 being connected to the cathode of rectifier tube 26. The other plate or anode of the tube 25 leads to secondary winding 55 of transformer 43, thence by way of conductor 56 to the other free terminal of transformer secondary 47, thence over conductors 49 and 50 to the common terminal of resistors 51 and 52. It is manifest, therefore, that one of the cathode-plate circuits of tube 25 is provided with voltages generated in the winding 45 and in half of the winding 47, and the other of said cathode-plate circuits is provided with voltages generated in the winding 55 and in the other half of winding 47 and the resultant of the voltages generated in winding 45 and one half of winding 47 will be rectified and flow through resistor 51 and the resultant of the voltages generated in winding 55 and the other half of winding 47 will also be rectified and will flow through resistor 51. Similar circuits are provided for the tube 26 which acts as a full wave rectifier to rectify the applied A. C. current and cause it to flow through resistor 52. The secondaries of transformer 43 are so poled as to be added vectorially to the voltages generated in the secondary winding 47 so that when the core 33 is in its normal position and the resultant voltage drop across primary winding 42 of transformer 43 is zero, the consequent D. C. voltage drop across resistors 51 and 52 will be equal and oppositely poled so that the voltage appearing between the free terminals of resistors 51 and 52 will be zero. If core 33 moves in one direction from its normal position, there will be a resulting voltage appear on primary winding 42 which will cause a decrease in the current flow in one of the tubes 25 and 26 and an increase in the other, as a consequence of which the voltage developed thereby across resistors 51 and 52 will be no longer zero but will be in an amount and direction or polarity determined by the direction of movement of the core 33 and the amount of said movement, that is, the direction of the movement of core 33, will determine the direction or polarity of said voltage across resistors 51 and 52 and its amount will determine the value thereof. A reverse movement of the core 33 will produce a reversal of this D. C. voltage across resistors 51 and 52 and its amount will be determined by the amount of said reverse movement of core 33 from its normal position.

To summarize it briefly, when core 33 is in its normal position there will be no D. C. voltage between the free or outer terminals of resistors 51 and 52. Movement of said core 33 in one direction will cause one of said terminals to be positive with respect to the other by an amount determined by the amount of movement of said core 33 from its normal position. Reverse movement of the core 33 from its normal position will cause the other of said terminals of resistors 51 and 52 to be positive with respect to the first in an amount determined by the amount of movement of said core 33 from said normal position. The arrangement is preferably such that when the core 33 moves to indicate a light or low position, the free terminal of resistor 51 is made positive with respect to the free terminal of resistor 52 and conversely, if the core 33 is moved to indicate a heavy or overload condition, the free terminal of resistor 51 is made negative with respect to the free terminal of resistor 52. When the apparatus is used with the scale of the above mentioned Francis patent, inadequate material on the scale will produce a light condition and overload on the scale will produce a heavy condition.

I shall now describe the apparatus by which use is made of this variable D. C. voltage which appears across the free terminals of resistors 51 and 52. The apparatus by which this voltage is produced under the control of the A. C. voltage in coil 42 represents one important sub-combination of my invention, and the apparatus which employs said D. C. voltage to control the feed rate of the feeder, or more generically to control the current flow of the plate circuit of tube 13, represents another sub-combination of my invention, which I shall now describe in detail.

The plate or output circuit of the tube 13 was previously described. It is to be noted that this circuit includes a source of alternating current. The value of the current flow in said plate or output circuit is determined by the grid shift method of control of the grid or input circuit, that is, the plate circuit current is controlled by the phase relation between the alternating current voltage on the grid circuit relative to said plate circuit alternating current voltage. This phase relation is automatically shifted by variations in the amount and direction or polarity of the D. C. voltage appearing across the free terminal of resistors 51 and 52. The grid, input, or grid-cathode circuit of the tube 13 extends by way of conductor 57 connected to the center tap of the secondary winding of transformer 12 which leads to the cathode of tube 13, thence to a pair of condensers 58 connected in series, thence to conductor 59 through a time delay resistor bridge-work, designated generally by the reference character 60, and thence through the secondary of a transformer 61 and to the grid of tube 13 through a current limiting resistor. A grid protecting condenser 62 is also preferably connected between conductors 57 and 59. The transformer 61 is energized from conductors 10 and 11, through a phase shifting condenser 63, the circuit including a conductor 64 having a switch 65 therein which is provided so that the filament of tube 13 may be heated from mains 10 and 11 a short while before switch 65 is closed to connect the input or grid circuit of said tube 13 in the system. The voltage developed in said input circuit by the secondary coil of transformer 61 normally lags the plate voltage of said tube 13 preferably by approximately 90 degrees, under which conditions the current flow in the plate circuit of tube 13 will take place only during approximately the last half of each positive half cycle of voltage fluctuation of said plate circuit. By shifting this phase relation, said current flow may be varied in a manner well understood in the electronic art, the resulting current flow where a single tube 13 is employed being, of course, a series of pulsations or undulations, the frequency of which corresponds to the frequency of the voltage on conductors 10 and 11 and the effective value of which is determined by said phase relation. This phase relation is shifted by superposing a direct current on the alternating current on said grid circuit and the phase relation may be shifted in opposite directions by oppositely poled direct currents superposed and the amount of said grid shift will be determined by the value of said direct current imposed. Consequently, the variable direct current voltage appearing on the free terminals of resistors 51 and 52 will be employed to shift the phase relation between the voltages of tube 13 and consequently control the current flow in said plate circuit. To this end it is to be seen that the free or outer terminals of resistors 51 and 52 are connected by conductors 66 and 67, respectively, across the terminals of condensers 58. The conductor 67 extends directly to one terminal of the condensers 58, the conductor 66 extending to the other terminal thereof only through the previously mentioned bridge-work 60.

The function of the condensers 58 and the associated bridge-work 60 is primarily to provide a time delay in this grid control provided by the direct current grid shifting potential. For example, if the conductor 66 is made positive with respect to the conductor 67 in response to a light condition, a current will flow through the bridge-work 60 to charge condensers 58 at a rate determined by the effective value of said bridge-work 60 which may be varied and by the value of said resistors 51 and 52. Consequently, the voltage on condensers 58 will gradually build up, causing a gradual shift in the phase relation of the grid and plate voltages of tube 13. Should the voltage between conductors 66 and 67 disappear, condensers 58 will tend to discharge gradually through the bridge-work 60 and resistors 51 and 52 which, under such conditions, constitute a very high resistance shunt circuit therefor in the normal operation of the system. For example, in connection with the "Waytrol," the device shown in the about identified Francis patent, there will be a more or less constant moving of the core 33 from its normal position first to a light condition and then to a heavy condition with a result that the direct current voltage superposed on the grid circuit of tube 13 by the condensers 58 will be more or less continuously fluctuating rather slowly above and below a normal condition and this normal condition is not fixed at all but is floating, in that it may have any value necessary to maintain the feed rate of the feeder such as to keep the scale beam in approximately a balanced condition at all times. Because of this fact the rate of feed of the "Waytrol" can be adjustable by the simple expedient of adjusting the counter-poise on the scale beam and the control system will automatically take care of the situation after a relatively short transient period to maintain the average load upon the continuous conveyor substantially constant at all times.

There is another important function of the bridgework 60 and associated condensers 58 in that an increment of sudden regulating D. C. voltage is first applied, then a gradual shift in said D. C. voltage under certain normal conditions. For example, let it be assumed that there is no voltage developed between conductors 66 and 67 due to a balanced or normal condition of core 33. Condensers 58 will then be discharging, or possibly totally discharged. Suppose core 33 is then moved from normal to produce a voltage, such as 6 volts, across conductors 66 and 67. Current will immediately start to flow to condensers 58 but the immediate D. C. voltage superposed on the grid circuit of tube 13, that is the phase shifting D. C. voltage, will not immediately be 6 volts but will be less than 6 volts by an amount determined by the position of variable tap to which conductor 59 is connected. If this tap were connected to the right hand end of bridge-work 60 this increment, or immediate D. C voltage would be zero. If said tap were connected directly to conductor 66 (as in practice it preferably cannot be) the increment would be the full 6 volts. Therefore, the position of said tap will determine this increment or the proportion of the full D. C. voltage on conductors 66 and 67, minus that on condensers 58 at that moment, which is applied instantaneously to the control circuit of tube 13. If the voltage on conductors 66 and 67 persists, the D. C. voltage of the tap connected to conductor 59 will build up gradually and unless the voltage on conductors 66 and 67 is reduced due to this progressive correction (as in practice it generally will) said D. C. voltage on conductor 59 will equal that on conductor 66, relative to conductor 67, of course, which would be 6 volts in the illustration, which condition would produce the maximum power output of tube 13. In other words, unless the increase in current flow from tube 13 is effective to reduce the voltage across conductors 66 and 67 to zero (which normally it will), there will be a progressive increasing in said output current, following the increment of substantially instantaneous increase therein, until the full output current flows. A reverse movement of core 33 will, of course, produce a reverse condition, and in the extreme, but not normal, case will reduce the current output of tube 13 to substantially zero. In practice the average charge on condensers 58 will be floating and a balanced condition of core 33 by no means will normally result in condensers 58 being discharged. They probably will normally always be charged and periodic movement of core 33 will produce alternate charging thereof by producing a voltage on conductors 66 and 67 followed by a normal position of core 33 and a slow discharging of said condensers 58, but only for a short period, insufficient to allow them to discharge completely. This floating normal condition charge on said condensers, which is always tending to discharge through bridge-work 60 and resistors 61 and 62 when the core 33 is balanced, may vary in amount from substantially the maximum voltage in one direction, as the maximum positive voltage on conductor 66, through zero and to substantially the maximum voltage in the other direction, as the maximum negative voltage on conductors 66. The value of the increment or instantaneous voltage ratio may be adjusted by adjusting the position of the tap connected to conductor 59 and this increment will be zero if said tap is connected to the right hand end of bridge-work 60. The other variable tap on bridge-work 60 controls the total effective resistance thereof.

In the operation of this system, particularly as viewed from the overall standpoint, it is manifest that it is entirely automatic to maintain a current flow in the output or plate circuit of the tube 13 such as to maintain a feed rate of the feeder so that the indicator associated with the scale or the like will be maintained substantially at its normal position at all times, the movements thereof from the normal position being employed only to maintain this substantial constant condition, as a consequence of which the overall accuracy of such a constant feeder is extremely high. It is also to be noted that in the control system which I have provided I have eliminated all of the relays of the control system of the Francis patent, as well as all motor driven rheostats and all make and break switches. These contributions are of extreme importance because it has been found in practice that in the control system of said Francis patent the number of times the switches or relays operate in a year are extremely high and are beyond the normal rate of operation for which said switches and relays are generally employed, thus reducing their life in terms of time. By eliminating such switches, relays and motor driven rheostats, I have a system which is simplified and one in which the life of the parts thereof is greatly extended.

As above stated, the control system was designed particularly as a substitute for that described in the above-mentioned patent to Earle V. Francis, No. 2,276,383, but its utility is not restricted to said system and various sub-combinations thereof may be used in vastly different systems.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A control system for an electric motor comprising a member adjustable to normal, high and low positions, an electronic discharge tube having an input circuit and an output circuit through which current flows at a controllable rate to control an electric motor, means operative when said adjustable member is in its normal position to control the voltage applied to said input circuit to maintain a substantially constant current flow in said output circuit, said means also being operative in response to a high position of said member to decrease the current flow in said output circuit and being operative in response to a low position of said member to increase the current flow therein, said means including a source of alternating current input voltage on said input circuit which is normally out of phase with the output circuit voltage of said electron discharge tube, and means including a reversible source of direct current superposed thereon for shifting said input voltage phase relation relative to the output voltage.

2. A control system for an electric motor comprising a member adjustable to normal, high and low positions, an electronic discharge tube having an input circuit and an output circuit through which current flows at a controllable rate to control an electric motor, means operative when said adjustable member is in its normal position to control the voltage applied to said input circuit to maintain a substantially constant current flow in said output circuit, said means also being operative in response to a high position of said member to decrease the current flow in said output circuit and being operative in response to a low position of said member to increase the current flow therein, said means including a source of alternating current input voltage on said input circuit which is normally out of phase with the output circuit voltage of said electron discharge tube, and means for shifting said input voltage phase relation relative to the output voltage.

3. A control system for an electric motor comprising a member adjustable to normal, high and low positions, an electronic discharge tube having an input circuit and an output circuit through which current flows at a controllable rate to control an electric motor, means including a D. C. condenser operative when said adjustable member is in its normal position to control the voltage applied to said input circuit to maintain a substantially constant current flow in said output circuit, said means also being operative in response to a high position of said member to decrease the current flow in said output circuit and being operative in response to a low position of said member to increase the current flow therein.

4. A control circuit including a transformer having two voltage producing coils connected together at one end so that the voltage across their free ends is normally a predetermined amount, said transformer having a shiftable core element which in its normal condition produces the predetermined voltage as aforesaid, said transformer being constructed to increase the said predetermined voltage in opposite directions when said core element is shifted in opposite directions, mechanism controlled by the voltage developed across said coil free ends for producing a direct current voltage which may be reversed as to polarity and variable in value from zero to a predetermined value in reverse directions, and means controlled by said direct current voltage for controlling the rate of current flow, said last named means including an electron discharge tube.

5. A control circuit including a transformer having two voltage producing coils connected together at one end so that the voltage across their free ends is normally a predetermined amount, said transformer having a shiftable core element which in its normal condition produces the predetermined voltage as aforesaid, said transformer being constructed to increase the said predetermined voltage in opposite directions when said core element is shifted in opposite directions, mechanism controlled by the voltage developed across said coil free ends for producing a direct current voltage which may be reversed as to polarity and variable in value from zero to a predetermined value in reverse directions, and means controlled by said direct current voltage for controlling the rate of current flow.

6. A control circuit for an electron discharge tube having an input circuit and an output circuit energized from a source of alternating current, means producing an alternating voltage on said input circuit which is normally out of phase with said output circuit voltage, and means for shifting the phase between the two voltages above recited including means for superposing a direct current voltage on said input circuit which is adjustable in value and direction.

7. A control circuit for an electron discharge tube having an input circuit and an output circuit energized from a source of alternating current, means producing an alternating voltage on said input circuit which is normally out of phase with said output circuit voltage, and means for shifting the phase between the two voltages above recited including means for superposing a direct current voltage on said input circuit.

8. A control circuit for an electron discharge tube having an input circuit and an output circuit energized from a source of alternating current, means producing an alternating voltage on said input circuit which is normally out of phase with said output circuit voltage, and means for shifting the phase between the two voltage above recited including means for superposing a direct current voltage on said input circuit, which is adjustable in value.

9. In a control circuit, an electron discharge tube having a control input network circuit, said network circuit including a source of alternating current voltage, a condenser, a high resistance shunt circuit for said condenser including a source of direct current voltage, and means for varying the value of said direct current voltage and reversing its polarity.

10. In a control circuit, an electron discharge tube having an input circuit, a condenser, a charging circuit for said condenser including a high resistance shunt and a source of direct current voltage, and means connecting the input circuit of said tube to be subject to the voltage across said condenser and a portion of said resistance.

11. A control circuit including a pair of rectifiers having one of their terminals connected to opposite ends of an impedance, a conductor connected to an intermediate point of said impedance, said conductor leading to branch circuits, one individual to each of said rectifiers, and two source of alternating current voltage in each of said branch circuits, one of said sources being variable in amount and direction.

12. A control circuit including a pair of rectifiers having one of their terminals connected to opposite ends of an impedance, a conductor connected to an intermediate point of said impedance, said conductor leading to branch circuits, one individual to each of said rectifiers, and two sources of alternating current voltage in each of said branch circuits, one of said sources being variable in direction.

13. A control circuit including a pair of rectifiers having one of their terminals connected to opposite ends of an impedance, a conductor connected to an intermediate point of said impedance, said conductor leading to branch circuits, one individual to each of said rectifiers, and two sources of alternating current voltage in each of said branch circuits, one of said sources being variable.

14. A control circuit including an electronic tube having an input control circuit and an output circuit, a condenser and a source of fluctuating voltage in said control circuit, and means for charging said condenser in reverse directions and to variable voltages, thereby to control the current flow in said output circuit.

15. A control circuit including an electronic tube having an input control circuit and an output circuit, a condenser and a source of fluctuating voltage in said control circuit, and means for charging said condenser to variable value thereby to control the current flow in said output circuit.

16. A control circuit including an electronic tube having an input control circuit and an output circuit, a condenser in said control circuit, and means for charging said condenser in reverse directions and to variable voltages, thereby to control the current flow in said output circuit.

17. A control system including a tube having a control circuit, means for putting a variable D. C. control voltage on said control circuit including a condenser, a source of D. C. voltage and a resistor so connected that when said source of voltage first develops a voltage there will be an increment of voltage immediately applied to said control circuit and the control voltage will increase after said increment is applied by charging said condenser through said resistor from said source when said source of voltage is maintained.

18. A control circuit including an electronic tube having an input and an output circuit, a source of alternating voltage for said output circuit, means in said input circuit for controlling the current flow in said output circuit including a source of alternating voltage which is out of phase relative to said first named source of voltage, a condenser having a high resistance shunt circuit, and a controlled source of direct current for charging said condenser; and means responsive to a variable condition for controlling the charging of said condenser from said source of direct current.

19. A control circuit including an electronic tube having an input and an output circuit, means in said input circuit for controlling the current flow in said output circuit including a condenser having a high resistance shunt circuit, and a controlled source of direct current for charging said condenser; and means responsive to a variable condition for controlling the charging of said condenser from said source of direct current.

20. A control circuit including an electronic tube having an input and an output circuit, a source of alternating voltage for said output circuit, a variable condition indicator, means in said input circuit controlled by said indicator for controlling the current in said output circuit and including a chargeable input circuit biasing condenser, a source of alternating voltage which is out of phase with said first named voltage, and means for varying the charge on said condenser.

21. A control circuit including an electronic tube having an input and an output circuit, a variable condition indicator, means in said input circuit controlled by said indicator for controlling the current in said output circuit and including a chargeable input circuit biasing condenser, and means for varying the charge on said condenser.

CLYDE W. BAIRD.